United States Patent
Nakajima et al.

(10) Patent No.: US 6,768,832 B2
(45) Date of Patent: Jul. 27, 2004

(54) ARRAYED WAVEGUIDE GRATING OPTICAL MULTIPLEXER/DEMULTIPLEXER AND METHOD FOR MANUFACTURING THE SAME

(75) Inventors: Takeshi Nakajima, Tokyo (JP); Kazutaka Nara, Tokyo (JP); Kazuhisa Kashihara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 118 days.

(21) Appl. No.: 10/175,779

(22) Filed: Jun. 21, 2002

(65) Prior Publication Data

US 2003/0012501 A1 Jan. 16, 2003

(30) Foreign Application Priority Data

Jun. 22, 2001 (JP) .......................................... 2001-189909
Mar. 11, 2002 (JP) .......................................... 2002-065549

(51) Int. Cl.⁷ .............................. G02B 6/28; G02B 6/34; G02B 6/26; G02B 6/42
(52) U.S. Cl. .............................. 385/24; 385/15; 385/37; 385/43
(58) Field of Search .............................. 385/14, 15, 24, 385/37, 43

(56) References Cited

U.S. PATENT DOCUMENTS

| | | | |
|---|---|---|---|
| 5,243,672 A | 9/1993 | Dragone | 385/46 |
| 5,822,481 A * | 10/1998 | Mestric | 385/46 |
| 6,195,481 B1 | 2/2001 | Nakajima et al. | 385/24 |
| 6,393,170 B1 | 5/2002 | Nakajima et al. | 385/14 |
| 6,404,946 B1 | 6/2002 | Nakajima et al. | 385/24 |
| 6,418,249 B1 | 7/2002 | Nakamura et al. | 385/24 |
| 6,442,314 B2 * | 8/2002 | Nara et al. | 385/37 |
| 6,571,037 B1 * | 5/2003 | Rogers et al. | 385/37 |
| 2001/0012426 A1 * | 8/2001 | Kato | 385/37 |
| 2002/0181868 A1 * | 12/2002 | McGreer | 385/37 |

* cited by examiner

Primary Examiner—Brian Healy
Assistant Examiner—Tina M Lin
(74) Attorney, Agent, or Firm—Oblon, Spivak, McClelland, Maier & Neustadt, P.C.

(57) ABSTRACT

An arrayed waveguide grating optical multiplexer/demultiplexer includes an arrayed waveguide having a plurality of channel waveguides which includes a shortest channel waveguide having a shortest length. Each channel waveguide includes a curved portion provided between first and second connection portions. The shortest channel waveguide has a radius ($R_1$) of curvature of the curved portion and an angle ($\theta_1$) which is a half of a central angle of the curved portion. The radius ($R_1$) of curvature and the angle ($\theta_1$) are determined such that a product ($R_1 \times \theta_1$) is a value within a range which includes a minimum value of the product ($R_1 \times \theta_1$) and in which all of the plurality of channel waveguides are drawn.

35 Claims, 5 Drawing Sheets

US 6,768,832 B2

ARRAYED WAVEGUIDE GRATING OPTICAL MULTIPLEXER/DEMULTIPLEXER AND METHOD FOR MANUFACTURING THE SAME

CROSS-REFERENCE TO RELATED APPLICATIONS

The present application claims priority to Japanese Patent Application No. 2001-189909, filed Jun. 22, 2001 and Japanese Patent Application No. 2002-65549, filed Mar. 11, 2002. The contents of these applications are incorporated herein by reference in their entirety.

BACKGROUND OF THE INVENTION

1. Field of the Invention

The present invention relates to an arrayed waveguide grating optical multiplexer/demultiplexer and a method for manufacturing the same.

2. Discussion of the Background

Recently, in optical communications, research and development of the optical wavelength division multiplexing transmission has been conducted actively for the way to dramatically increase the transmission capacity thereof, and practical applications have been proceeding. The optical wavelength division multiplexing transmission is that a plurality of lights having wavelengths different from each other are multiplexed and are transmitted, for example. Such optical wavelength division multiplexing transmission systems need optical multiplexers/demultiplexers for multiplexing lights having wavelengths different from each other or demultiplexing a light to lights having wavelengths different from each other. As one example of such optical multiplexer/demultiplexers, an arrayed waveguide grating (AWG) is known.

For the high quality optical wavelength division multiplexing transmission, it is required that crosstalk with other channels is small.

SUMMARY OF THE INVENTION

According to one aspect of the present invention, an arrayed waveguide grating optical multiplexer/demultiplexer includes at least one first optical waveguide, a first slab waveguide, an arrayed waveguide connected to the at least one first optical waveguide via the first slab waveguide, a second slab waveguide, and a plurality of second optical waveguides connected to the arrayed waveguide via the second slab waveguide. The arrayed waveguide includes a plurality of channel waveguides each of which has a different length and which includes a shortest channel waveguide having a shortest length. Each of the plurality of channel waveguides includes first and second connection portions and a curved portion provided between the first and second connection portions. The first connection portion is connected to the first slab waveguide. The second connection portion is connected to the second slab waveguide. The shortest channel waveguide has a radius ($R_1$) of curvature of the curved portion and an angle ($\theta_1$) which is a half of a central angle of the curved portion. The radius ($R_1$) of curvature and the angle ($\theta_1$) are determined such that a product ($R_1 \times \theta_1$) of the radius ($R_1$) of curvature and the angle ($\theta_1$) is a value within a range which includes a minimum value of the product ($R_1 \times \theta_1$) and in which all of the plurality of channel waveguides are drawn.

According to another aspect of the present invention, an arrayed waveguide grating optical multiplexer/demultiplexer includes at least one first optical waveguide, a first slab waveguide, an arrayed waveguide connected to the at least one first optical waveguide via the first slab waveguide, a second slab waveguide, and a plurality of second optical waveguides connected to the arrayed waveguide via the second slab waveguide. The arrayed waveguide includes a plurality of channel waveguides each of which has a different length and which includes a shortest channel waveguide having a shortest length. Each of the plurality of channel waveguides includes first and second connection portions and a curved portion provided between the first and second connection portions. The first connection portion is connected to the first slab waveguide. The second connection portion is connected to the second slab waveguide. The curved portion includes a first curved section connected to the first connection portion and a second curved section connected to the second connection portion. The shortest channel waveguide has a first radius ($R_{1L}$) of curvature of the first curved section, a second radius ($R_{1R}$) of curvature of the second curved section, a first angle ($\theta_{1L}$) which is a central angle of the first curved section, and a second angle ($\theta_{1R}$) which is a central angle of the second curved section. The first radius ($R_{1L}$) of curvature, the second radius ($R_{1R}$) of curvature, the first angle ($\theta_{1L}$) and the second angle ($\theta_{1R}$) are determined such that a first product ($R_{1L} \times \theta_{1L}$) of the first radius ($R_{1L}$) of curvature and the first angle ($\theta_{1L}$) is a value within a first range which includes a minimum value of the first product ($R_{1L} \times \theta_{1L}$) and in which all of the plurality of channel waveguides are drawn and a second product ($R_{1R} \times \theta_{1R}$) of the second radius ($R_{1R}$) of curvature and the second angle ($\theta_{1R}$) is a value within a second range which includes a minimum value of the second product ($R_{1R} \times \theta_{1R}$) and in which all of the plurality of channel waveguides are drawn.

According to yet another aspect of the present invention, an arrayed waveguide grating optical multiplexer/demultiplexer includes at least one first optical waveguide, a first slab waveguide, an arrayed waveguide connected to the at least one first optical waveguide via the first slab waveguide, a second slab waveguide, and a plurality of second optical waveguides connected to the arrayed waveguide via the second slab waveguide. The arrayed waveguide includes a plurality of channel waveguides each having different length. A length of each of the plurality of channel waveguides is determined as short as possible to suppress phase errors of lights propagating through the plurality of channel waveguides.

According to further aspect of the present invention, a method for manufacturing an arrayed waveguide grating optical multiplexer/demultiplexer includes providing an arrayed waveguide which includes a plurality of channel waveguides each of which has a different length and which include a shortest channel waveguide having a shortest length. Each of the plurality of channel waveguides includes first and second connection portions and a curved portion provided between the first and second connection portions. The shortest channel waveguide has a radius ($R_1$) of curvature of the curved portion and an angle ($\theta_1$) which is a half of a central angle of the curved portion. The first connection portion is connected to a first slab waveguide. The second connection portion is connected to a second slab waveguide. The radius ($R_1$) of curvature and the angle ($\theta_1$) are determined such that a product ($R_1 \times \theta_1$) of the radius ($R_1$) of curvature and the angle ($\theta_1$) is a value within a range which includes a minimum value of the product ($R_1 \times \theta_1$) and in which all of the plurality of channel waveguides are drawn.

According to yet further aspect of the present invention, a method for manufacturing an arrayed waveguide grating optical multiplexer/demultiplexer includes providing an arrayed waveguide which includes a plurality of channel waveguides each of which has a different length and which include a shortest channel waveguide having a shortest length. Each of the plurality of channel waveguides including first and second connection portions and a curved portion provided between the first and second connection portions. The curved portion includes a first curved section connected to the first connection portion and a second curved section connected to the second connection portion. The shortest channel waveguide has a first radius ($R_{1L}$) of curvature of the first curved section, a second radius ($R_{1R}$) of curvature of the second curved section, a first angle ($\theta_{1L}$) which is a central angle of the first curved section, and a second angle ($\theta_{1R}$) which is a central angle of the second curved section. The first connection portion is connected to a first slab waveguide. The second connection portion is connected to a second slab waveguide. The first radius ($R_{1L}$) of curvature, the second radius ($R_{1R}$) of curvature, the first angle ($\theta_{1L}$) and the second angle ($\theta_{1R}$) are determined such that a first product ($R_{1L} \times \theta_{1L}$) of the first radius ($R_{1L}$) of curvature and the first angle ($\theta_{1L}$) is a value within a first range which includes a minimum value of the first product ($R_{1L} \times \theta_{1L}$) and in which all of the plurality of channel waveguides are drawn and a second product ($R_{1R} \times \theta_{1R}$) of the second radius ($R_{1R}$) of curvature and the second angle ($\theta_{1R}$) is a value within a second range which includes a minimum value of the second product ($R_{1R} \times \theta_{1R}$) and in which all of the plurality of channel waveguides are drawn.

According to further aspect of the present invention, a method for manufacturing an arrayed waveguide grating optical multiplexer/demultiplexer includes providing an arrayed waveguide which includes a plurality of channel waveguides each having different length. At least one first optical waveguide and the arrayed waveguide are connected via a first slab waveguide. A plurality of second optical waveguides and the arrayed waveguide are connected via a second slab waveguide. A length of each of the plurality of channel waveguides is determined as short as possible to suppress phase errors of lights propagating through the plurality of channel waveguides.

BRIEF DESCRIPTION OF THE DRAWINGS

A more complete appreciation of the invention and many of the attendant advantages thereof will become readily obtained as the same becomes better understood with reference to the following detailed description when considered in conjunction with the accompanying drawings, wherein.

DESCRIPTION OF THE EMBODIMENTS

Figure 1:
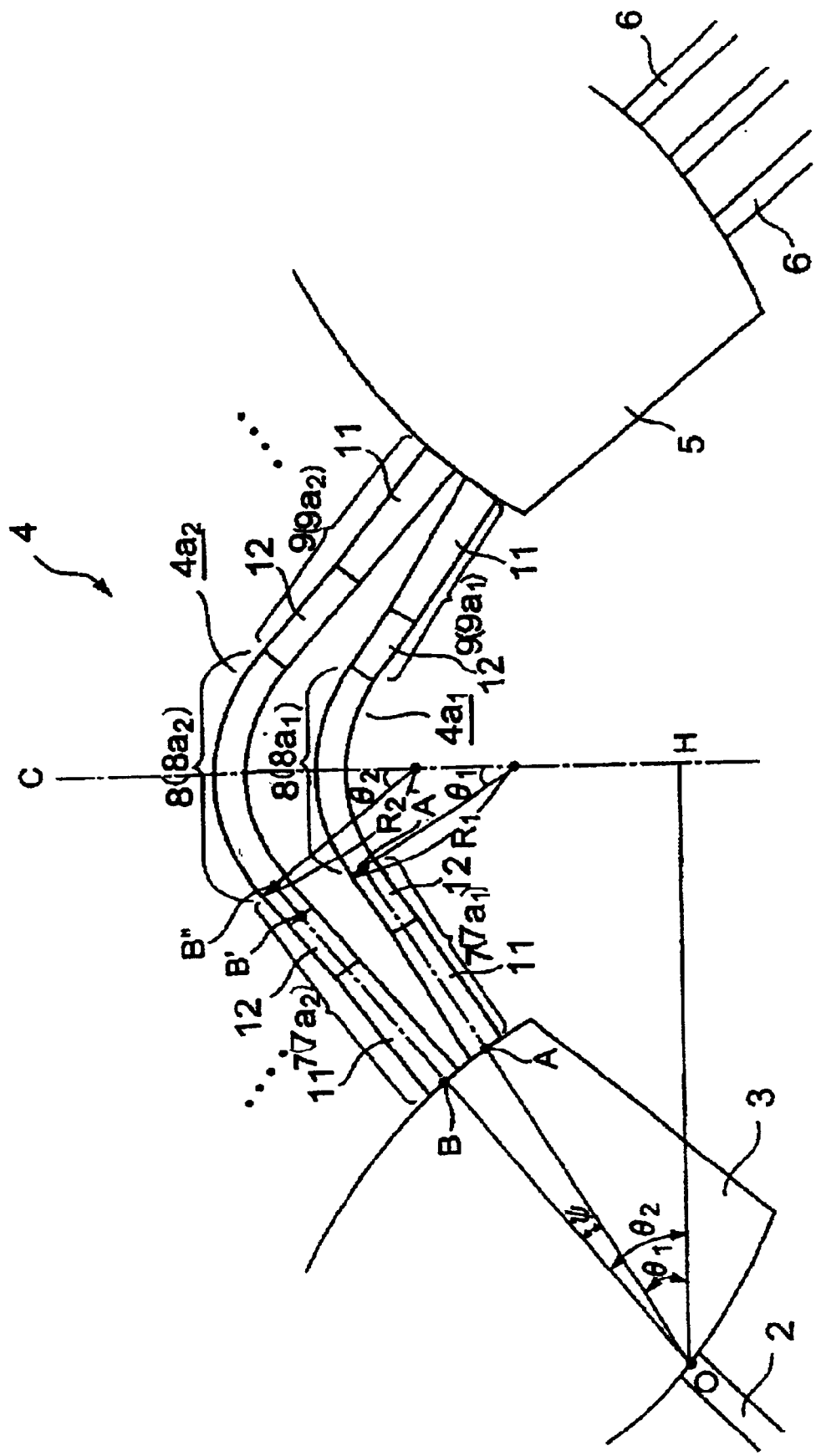
FIG. 1 is an enlarged, schematic diagram showing a part of channel waveguides and peripheries thereof of an arrayed waveguide grating optical multiplexer/demultiplexer according to an embodiment of the present invention.

The embodiments will now be described with reference to the accompanying drawings, wherein like reference numerals designate corresponding or identical elements throughout the various drawings.

Figure 2:
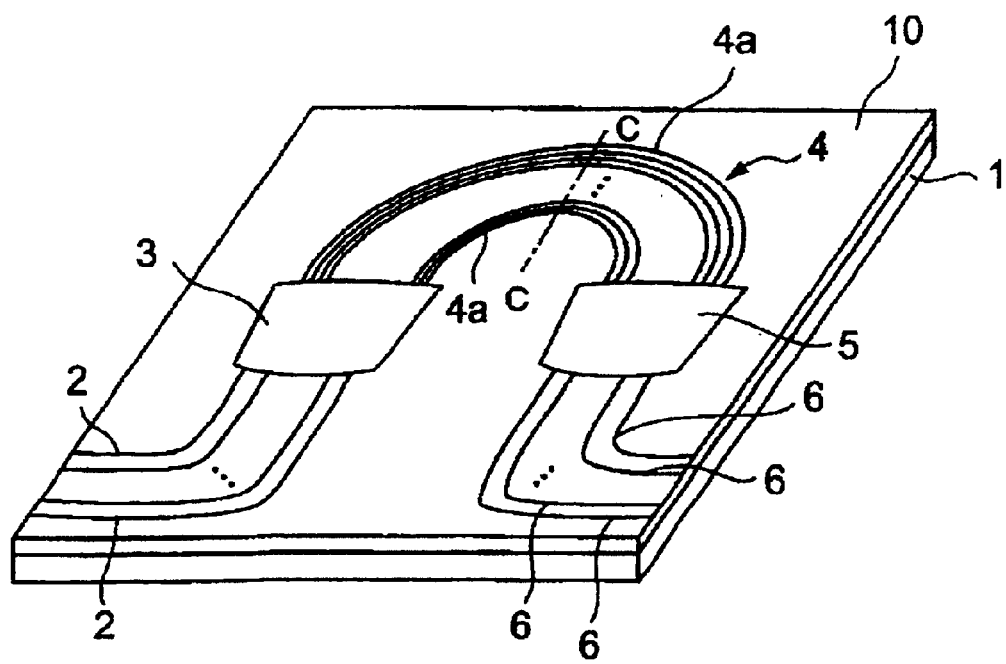
FIG. 2 is an explanatory diagram schematically showing a structure of an arrayed waveguide grating optical multiplexer/demultiplexer according to the embodiment of the present invention.

The arrayed waveguide grating is that a waveguide pattern as shown in FIG. 2 is formed on a substrate 1, for example. Referring to FIG. 2, the waveguide pattern is formed to have at least one optical input waveguide (at least one first optical waveguide) 2 arranged side by side, a first slab waveguide 3 connected to the outgoing side of the optical input waveguides 2, an arrayed waveguide 4 connected to the outgoing side of the first slab waveguide 3, a second slab waveguide 5 connected to the outgoing side of the arrayed waveguide 4, and a plurality of optical output waveguides (second optical waveguides) 6 which are arranged side by side and which are connected to the outgoing side of the second slab waveguide 5.

The arrayed waveguide 4 propagates light that has been led through the first slab waveguide 3. The arrayed waveguide 4 includes a plurality of channel waveguides (4a) arranged side by side. The length of the adjacent channel waveguides (4a) varies each other by a predetermined length ($\Delta L$).

Additionally, the optical output waveguides 6 are disposed corresponding to the number of signal lights having different wavelengths each other, and the signal lights are demultiplexed by the arrayed waveguide grating, for example. The channel waveguides (4a) that constitute the arrayed waveguide 4 are generally disposed in multiple such as one hundred. However, in FIG. 2, the number of the channel waveguides (4a), the optical output waveguides 6 and the optical input waveguides 2 are schematically depicted to simplify the drawing.

For example, the transmitting side of optical fibers is connected to the optical input waveguides 2 to lead a multiplexed light. The light that has been led to the first slab waveguide 3 through one of the optical input waveguides 2 and is diffracted by the diffraction effects enters the arrayed waveguide 4.

The light that has propagated through the arrayed waveguide 4 reaches the second slab waveguide 5. Then, the lights having different wavelengths are focused at the optical output waveguides 6 to be outputted. The length of the adjacent channel waveguides (4a) of the arrayed waveguide 4 varies each other by the predetermined length. Thus, a shift is generated in the phase of the respective lights having different wavelengths after propagating through the arrayed waveguide 4. According to this shifted amount, the phasefront of these lights is tilted. This tilted angle determines the positions at which the lights are focused. Therefore, the positions at which the lights having different wavelengths are focused differ from each other. On this account, the optical output waveguides 6 are formed on the positions at which the lights are focused and thereby the lights having different wavelengths can be outputted from the different optical waveguides 6 at every wavelength.

For example, as shown in FIG. 2, when a multiplexed light having wavelengths λ1, λ2, λ3, . . . λn (n is an integer of two or greater) is inputted from one of the optical input waveguides 2, this light is diffracted at the first slab waveguide 3 to reach the arrayed waveguide 4. Then, they pass through the arrayed waveguide 4 and the second slab waveguide 5, are focused at different positions according to wavelengths and enter the optical output waveguides 6 different from each other, as set forth. Then, each of lights passes through the respective optical output waveguides 6 and is outputted from the output end of the optical output waveguides 6. An optical fiber for outputting light is connected to the output end of each of the optical output waveguides 6 and thereby each of the lights having a different wavelength is removed through the optical fiber.

Further, the arrayed waveguide grating optical multiplexer/demultiplexer has the principle of the light reciprocity (reversibility), and therefore has a function of an optical demultiplexer and a function of an optical multiplexer as well. That is, in a direction reverse to the direction in the above described embodiment, the light beams having a plurality of different wavelengths enter the optical output waveguides 6 corresponding to the respective wavelengths, then travel through the transmission path in the reverse direction. These light beams are multiplexed in the arrayed waveguides 4 and exit through one of the optical input waveguides 2.

In this arrayed waveguide grating optical multiplexer/demultiplexer, the improvement of the wavelength resolution of the diffraction grating is in proportion to a length difference (ΔL) of each of the channel waveguides (4a) of the arrayed waveguide 4. Therefore, the ΔL is designed large and thereby the optical multiplexing/demultiplexing lights having a narrow wavelength spacing is made possible. Accordingly, the function of multiplexing a plurality of lights and demultiplexing a light, that is, the function of multiplexing a plurality of lights having a narrow wavelength spacing, for example, at most about 1 nm, or demultiplexing a light to a plurality of lights having the narrow wavelength spacing can be served, which is needed to realize the high-density optical wavelength division multiplexing transmission.

An arrayed waveguide grating shown in FIG. 2 is obtained by forming the waveguide pattern mentioned above on a substrate 1 made of silicon (Si), for example, in the following manner.

First, an under cladding film (the principle constituent is SiO2) and a core film (glass whose principle constituent is GeO2-doped SiO2, for example) are formed on the silicon substrate 1 one by one to form by the flame hydrolysis deposition method subsequently to consolidate. Then, the core film is patterned by photolithography and dry etching to form the waveguide described above. Subsequently, the waveguide pattern of the core film is covered to deposit an over cladding film by the flame hydrolysis deposition method, after that to consolidate, then the arrayed waveguide grating is fabricated.

In the arrayed wavelength grating multiplexer/demultiplexer, if the light enters from the optical input waveguide side, for example, the optical amplitude distribution in the interface between one of the optical input waveguides and the first slab waveguide is Fourier-transformed. Then, the Fourier-transformed pattern of the optical amplitude distribution is formed in the arrayed waveguide having a plurality of channel waveguides arranged side by side.

As described above, the lengths of the channel waveguides adjacent to each other in the arrayed waveguide are different from each other by the predetermined length. Therefore, after the lights are propagated through the arrayed waveguide, the phases of the respective lights become different. Accordingly, the phasefront of the focused lights is tilted according to the shifted amount, and the lights are focused at every wavelength in the direction substantially perpendicular to the phasefront. On this account, in theory, the optical amplitude distribution in the interface between one of the optical input waveguides and the first slab waveguide is substantially reproduced in the interface between the second slab waveguide and the optical output waveguides.

However, in the optical path from one of the optical input waveguides to the optical output waveguides, the lights in fact propagate as they are influenced by the manufacturing errors of the arrayed waveguide grating.

The influences of the manufacturing errors (process errors in manufacturing) of the arrayed waveguide grating are described specifically. Firstly, the light diffracted from one of the optical input waveguides is fluctuated due to the fluctuations in refractive index and the film thickness inside the first slab waveguide. Secondly, phase errors are generated due to fluctuations in the refractive index, the film thickness and the width (the width of the channel waveguide) inside the arrayed waveguide. Thirdly, when the light emitted from the arrayed waveguide is focused on the optical output waveguides, the pattern defocus occurs due to the fluctuations in refractive index and the film thickness inside the second slab waveguide.

As influenced by such manufacturing errors in manufacturing the arrayed waveguide grating, if the optical amplitude distribution in the interface between one of the optical input waveguides and the first slab waveguide is not substantially exactly reproduced in the interface between the second slab waveguide and the optical output waveguides, the crosstalk in the arrayed waveguide grating optical multiplexer/demultiplexer is deteriorated.

The present inventors considered that influences by the arrayed waveguide is particularly great among the manufacturing errors described above. Also, it is considered that the phase errors (phase fluctuation) of the lights propagating through the arrayed waveguide are increased as the length of each of the channel waveguides forming the arrayed waveguide becomes longer. Thus, the present inventors considered that the phase errors of the lights propagating through the arrayed waveguide may be suppressed by setting the length of each channel waveguide as short as possible, to thereby reduce the influence of manufacturing errors.

In general, in the arrayed waveguide grating optical multiplexer/demultiplexer, the lengths of the channel waveguides adjacent to each other are different from each other by the predetermined length. It is supposed that the optical path length of the m-th shortest channel waveguide among the plurality of channel waveguides is ($L_m$), the optical path length of the (m−1)-th shortest channel waveguide among the plurality of channel waveguides is ($L_{m-1}$), and the optical path length difference between the adjacent channel waveguides is (ΔL). In this case, the channel waveguides are provided to substantially satisfy the relationship expressed by the equation ($L_m=L_{m-1}+\Delta L$). In the present embodiment of the present invention, the channel waveguides are provided to substantially satisfy this relationship.

Also, as shown in FIG. 1, a plurality of channel waveguides (4a) respectively include first connection portions 7 ($7a_1, 7a_2, \ldots$) which are connected to the first slab waveguide 3 and second connection portions 9 ($9a_1, 9a_2, \ldots$) which are connected to the second slab waveguide 5. Also, a plurality of channel waveguides (4a) respectively include curved portions 8 ($8a_1, 8a_2, \ldots$) interposed between the first connection portions 7 ($7a_1, 7a_2, \ldots$) and the second connection regions 9 ($9a_1, 9a_2, \ldots$).

Here, in the shortest channel waveguide ($4a_1$) having the shortest length among a plurality of channel waveguides (4a), it is supposed that the length of the first connection portion ($7a_1$) in the first slab waveguide 3 side or the second connection portion ($9a_1$) in the second slab waveguide 5 side is ($L_{const}$), the radius of curvature of the curved portion ($8a_1$) is ($R_1$), a half of the central angle of the curved portion ($8a_1$) is $\theta_1$ (unit of an angle is rad.).

In general, each channel waveguide (4a) is formed substantially symmetrical with respect to the central position of its length, and the lengths of the connection portions ($7a_1$, $9a_1$) are substantially the same. Therefore, the optical path length ($L_1$) of the shortest channel waveguide ($4a_1$) is twice the length expressed by ($L_{const}+R_1\times\theta_1$). In other words, the optical path length ($L_1$) of the shortest channel waveguide ($4a_1$) is expressed by the following equation (1).

$$L_1 = 2(L_{const}+R_1\times\theta_1) \quad (1)$$

Also, as shown in FIG. 1, respective ends of the first and second slab waveguides 3, 5 in the arrayed waveguide side are formed in slightly curved form to be an arc of the circle having the focal length of the slab waveguide as a radius of curvature. Thus, it is supposed that the focal length of the first slab waveguide 3 is ($L_f$), and the length of a line OA and the length of a line OB are equal to ($L_f$).

Further, it is supposed that the length of a line AA' and the length of a line BB' are equal to $L_{const}$, and $\angle$AOB is equal to $\psi$. Then, the length of the arc connecting the point (A) and the point (B) is approximated to the length (P) of the straight line (AB), and the length of the arc connecting the point (A') and the point (B') is approximated to the length (P') of the straight line (A'B'). From the relationship between the central angle and the circumference, the following equations (2), (3) are given.

$$P \approx AB = L_f \cdot \psi \quad (2)$$

$$P' \approx A'B' = (L_f+L_{const})\cdot\psi \quad (3)$$

Therefore, from the equation (2), $\psi$ is substantially equal to $P/L_f$. When this value is applied to the equation (3), the following equation (4) is given.

$$P' = (L_f+L_{const})\cdot P/L_f \quad (4)$$

Further, the following equation (5) is derived from the equation (4). When the values (P), (P') and ($L_f$) determined at the step for designing the arrayed waveguide grating optical multiplexer/demultiplexer are substituted into the equation (5), the value ($L_{const}$) is determined.

$$L_{const} = \{(P'/P)-1\}\cdot L_f \quad (5)$$

In other words, the value ($L_{const}$) is constant determined by the design of the arrayed waveguide grating. Therefore, by minimizing the product ($R_1\times\theta_1$) of the radius ($R_1$) of curvature of the curved portion ($8a_1$) and the angle ($\theta_1$) which is a half of the central angle of the curved portion ($8a_1$), the optical path length of the shortest channel waveguide ($4a_1$) can be minimized.

Also, supposing that the optical path length of the second shortest channel waveguide (hereinafter referred to as second channel waveguide $4a_2$) provided secondly from the inner side is designated as $L_2$, $L_2$ is expressed by the following equation (6).

$$L_2 = 2(L_{const}+L_{st(2)}+R_2\times\theta_2) = L_1+\Delta L \quad (6)$$

Here, $L_{st(2)}$ is the value found by subtracting the length ($L_{const}$) of the connection region ($7a_1$) in the shortest channel waveguide ($4a_1$) from the length of the connection region ($7a_2$) in the second channel waveguide ($4a_2$), in other words, $L_{st(2)}$ is the value found by subtracting the length ($L_{const}$) of the connection region ($9a_1$) in the shortest channel waveguide ($4a_1$) from the length of the connection region ($9a_2$) in the second channel waveguide ($4a_2$). $L_{st(2)}$ equals to the length of the line B'B'' in FIG. 1. ($R_2$) is the radius of curvature of the curved portion ($8a_2$) in the second channel waveguide ($4a_2$), and $\theta_2$ is a half of the central angle of the curved portion ($8a_2$) in the second channel waveguide ($4a_2$).

The length (Q) of the line OH shown in FIG. 1 is expressed by the following equation (7) if the length of line OA', the length of line OB' and ($L_f+L_{const}$) are equal to X.

$$Q = X\cdot\cos\theta_1+R_1\cdot\sin\theta_1 = (X+L_{st(2)})\cdot\cos\theta_2+R_2\cdot\sin\theta_2 \quad (7)$$

Thus, if the radius ($R_1$) of curvature of the curved portion ($8a_1$) of the shortest channel waveguide ($4a_1$) and the angle $\theta_1$ are determined, the values $L_{st(2)}$ and $\theta_2$ are determined.

Then, the optical path lengths of the respective channel guides (4a) from the third shortest channel waveguide ($4a_3$) to the longest channel waveguide (4a) are determined by the manner described above, and the lengths of all of the channel waveguides forming the arrayed waveguide 4 can be determined.

Also, within a range in which all of the channel waveguides (4a) can be drawn, the product ($R_1\times\theta_1$) of the radius ($R_1$) of curvature and the angle $\theta_1$ determined with respect to the shortest channel waveguide ($4a_1$) is minimized, so that the respective optical path lengths of all of the channel waveguides (4a) can be minimized.

In the above described arrayed waveguide grating optical multiplexer/demultiplexer, the radius ($R_1$) of curvature and the angle $\theta_1$ are set such that the product ($R_1\times\theta_1$) of the radius ($R_1$) of curvature of the curved portion and the angle $\theta_1$ determined in the shortest channel waveguide ($4a_1$) is the value within the allowable range which includes the minimum value and in which all of the channel waveguides can be drawn. The allowable range is, for example, a range in which crosstalk of the arrayed waveguide grating optical multiplexer/demultiplexer is at most −30 dB. Therefore, the respective optical path lengths of all of the channel waveguides can be the minimum value or the value close to the minimum value. Therefore, the phase errors of the lights propagating through the arrayed waveguide can be suppressed to reduce the influence by the manufacturing errors. Therefore, according to the embodiments of the present invention, crosstalk of the arrayed waveguide grating optical multiplexer/demultiplexer can be suppressed.

The arrayed waveguide grating optical multiplexer/demultiplexer of the embodiment is an arrayed waveguide grating optical multiplexer/demultiplexer which multiplexes lights with an interval of 100 GHz and demultiplexes a light to lights with an interval of 100 GHz. The focal length ($L_f$) of each of the first and second slab waveguides (3 and 5) is 4567 μm, and the number of the channel waveguides (4a) is 106. Also, the optical path length difference (ΔL) between the adjacent channel waveguides (4a) is 63 μm, and the width of the waveguide and the height thereof are respectively 5 μm. Also, regarding the arranging pitch between the adjacent channel waveguides (4a), the length (P) of the line AB connecting between the point (A) and the point (B) shown in FIG. 1 is 10 μm, and the length (P') of the line A'B' connecting the point (A') and the point (B') is 11 μm.

The arrayed waveguide grating optical multiplexer/demultiplexer according to the present embodiment includes the lengths of the channel waveguides (4a) forming the arrayed waveguide 4 which are set as short as possible. The detail of this feature will be explained later.

As shown in FIG. 2, in the arrayed waveguide grating optical multiplexer/demultiplexer of the embodiment, each of the channel waveguides (4a) is formed to be substantially symmetrical with respect to the chain line C—C shown in FIG. 2, and each of the channel waveguides (4a) is formed to be substantially symmetrical with respect to the center position of the length thereof.

It is supposed that the m-th shortest optical path length among the plurality of channel waveguides (4a) is ($L_m$), the (m−1)-th shortest optical path length among the plurality of channel waveguides (4a) is ($L_{m-1}$), and the length difference between the adjacent channel waveguides (4a) is (ΔL). In this case, the relationship expressed by the equation ($L_m = L_{m-1} + \Delta L$) is satisfied.

Also, FIG. 1 schematically shows a part of the channel waveguides (4a) and the peripheries thereof, shown enlarged, for the better understanding of the structure of the arrayed waveguide 4 in the arrayed waveguide grating optical multiplexer/demultiplexer according to the present embodiment of the present invention. As shown in FIG. 1, a plurality of channel waveguides (4a) forming the arrayed waveguide 4 respectively include first connection portions 7 ($7a_1$, $7a_2$, ...) located in the first slab waveguide side of the channel waveguides (4a) and connected to the first slab waveguide 3 and second connection portions 9 ($9a_1$, $9a_2$, ...) located in the second slab waveguide side of the channel waveguides (4a) and connected to the second slab waveguide 5. Also, a plurality of channel waveguides (4a) respectively include curved portions 8 ($8a_1$, $8a_2$, ...) interposed between the first connection portions 7 ($7a_1$, $7a_2$, ...) and second connection portions 9 ($9a_1$, $9a_2$, ...).

The first connection portions 7 ($7a_1$, $7a_2$, ...) and the second connection portions 9 ($9a_1$, $9a_2$, ...) have the substantially same lengths, and include tapered sections 11 which respectively have the widths increasing toward the respective slab waveguides (3 and 5). Also, constant width sections 12 are formed respectively between the respective tapered sections 11 and the corresponding curved portions 8 ($8a_1$, $8a_2$, ...). The constant width section 12 has a substantially constant width.

In the shortest channel waveguide ($4a_1$) having the shortest length among the plurality of channel waveguides (4a), it is supposed that the length of the first connection portion ($7a_1$) or the second connection portion ($9a_1$) is ($L_{const}$), the radius of curvature of the curved portion ($8a_1$) is ($R_1$), and a half of the central angle of the curved portion ($8a_1$) is $\theta_1$. The optical path length ($L_1$) of the shortest channel waveguide ($4a_1$) is expressed by the aforementioned equation (1).

In the arrayed waveguide grating optical multiplexer/demultiplexer according to the present embodiment of the present invention, the radius ($R_1$) of curvature and the angle $\theta_1$ are determined such that the product ($R_1 \times \theta_1$) of the radius ($R_1$) of curvature and the angle $\theta_1$ is the value within the allowable range which includes the minimum value of the product ($R_1 \times \theta_1$) and in which all of the channel waveguides can be drawn.

Now, there will be explained a method to determine the radius ($R_1$) of curvature and the angle $\theta_1$ such that the product ($R_1 \times \theta_1$) of the radius ($R_1$) of curvature and the angle $\theta_1$ is substantially equal to its minimum value.

Firstly, the radius ($R_1$) of curvature is the minimum radius ($R_{min}$) of curvature or more within a range in which a light signal having wavelength range in use is not substantially attenuated. The minimum radius ($R_{min}$) of curvature is determined based on the relative refractive index difference of the arrayed waveguide grating optical multiplexer/demultiplexer, the height of the arrayed waveguide, the width of the channel waveguide, and the wavelength range in use.

Figure 3:
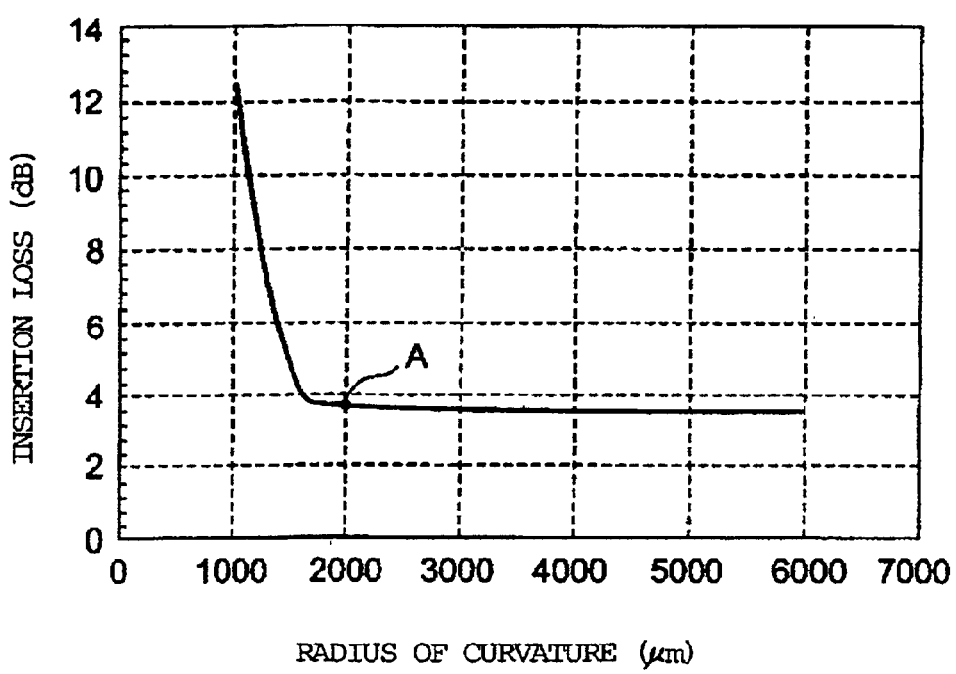
FIG. 3 is a graph showing a relationship between the radius of curvature of an optical waveguide and an insertion loss.

The minimum radius ($R_{min}$) of curvature may be determined by simulations or experiments. As shown in FIG. 3, for example, the insertion loss at the time of propagating the lights through the waveguide in the curved form is found with respect to the radius of the curvature, and the value (the point A in FIG. 3) slightly larger than the point where the insertion loss is suddenly increased can be found as the minimum radius ($R_{min}$) of curvature.

FIG. 3 shows the insertion loss obtained by the experiment when the lights are allowed to propagate through the waveguide in the curved form in which the relative refractive index difference Δ is 1.35%; the height and the width of the waveguide is 5.0 μm; and the wavelength range in use is in a range of the wavelength of 1.55 μm. In the present embodiment of the present invention, based on the graph shown in FIG. 3, the radius ($R_{min}$) of curvature is set to be 2000 μm.

Then, the angle $\theta_1$ is set at sufficiently large value, (π/2), for example, and the radius ($R_1$) of curvature is set to be the radius ($R_{min}$) of curvature of 2000 μm. Then, based on the aforementioned equations (1) to (7), it is checked whether all of the channel waveguides (4a) can be drawn. If all of the channel waveguides (4a) can be drawn, the angle $\theta_1$ is made slightly smaller than (π/2), and in the same manner, it is checked whether all of the channel waveguides (4a) can be drawn.

Then, the angle $\theta_1$ is further made smaller until a part of the channel waveguides (4a) can not be drawn. An angle $\theta_1'$ immediately before a part of the channel waveguides (4a) can not be drawn is used to determine a temporary value ($L_1'$) of the optical path length ($L_1$) of the shortest channel waveguide ($4a_1$) by using the following equation (8).

$$L_1' = 2(L_{const} + R_{min} \times \theta_1') \quad (8)$$

When a part of the channel waveguides (4a) can not be drawn as described above, the angle is $\theta_1'$. When the angle is equal to ($\theta_1'$), whether all of the channel waveguides (4a) can be drawn is checked as the radius ($R_1$) of curvature is gradually increased from ($R_{min}$).

It is supposed that the radius of curvature is ($R_1'$) when all of the channel waveguides (4a) can be drawn. A temporary value ($L_1''$) of the optical path length ($L_1$) of the shortest channel waveguide ($4a_1$) is determined by using the following equation (9) that is different from the equation (8).

$$L_1'' = 2(L_{const} + R_1' \times \theta_1'') \quad (9)$$

Then, the temporary value ($L_1'$) of the optical path length ($L_1$) of the shortest channel waveguide ($4a_1$) is compared with the temporary value ($L_1''$). If $L_1'$ is larger than $L_1''$, the angle $\theta_1$ is decreased to be smaller than the angle $\theta_1''$, so as to find the radius ($R_1$) of curvature which allows to draw all of the channel waveguides (4a). Thereby, the combination of the radius ($R_1$) of curvature and the angle $\theta_1$ is determined such that the optical path length of the shortest channel waveguide ($4a_1$) becomes the shortest. In other words, the radius ($R_1$) of curvature and the angle $\theta_1$ are determined such that the product ($R_1 \times \theta_1$) of the radius ($R_1$) of curvature and the angle $\theta_1$ becomes the minimum value.

The following Table 1 shows simulation result for determining the radius ($R_1$) of curvature and the value ($\theta_1/\pi$) that is the angle $\theta_1$ divided by $\pi$. This result shown in Table 1 is graphically shown in FIG. 4. The characteristic line (a) in FIG. 4 shows the relationship between the radius ($R_1$) of curvature and the value ($\theta_1/\pi$), and the characteristic line (b) shows the relationship between the optical path length ($L_1$) and the value ($\theta_1/\pi$).

TABLE 1

| $\theta_1/\pi$ | $R_1$ ($\mu$m) | $L_1$ ($\mu$m) |
|---|---|---|
| 0.30 | 2840 | 3530.7 |
| 0.33 | 2310 | 3351.3 |
| 0.34 | 2200 | 3322.7 |
| 0.35 | 2110 | 3303.7 |
| 0.36 | 2060 | 3309.9 |
| 0.37 | 2020 | 3321.5 |
| 0.38 ($\theta_1''$) | 2010 ($R_1'$) | 3354.3 ($L_1''$) |
| 0.39 ($\theta_1'$) | 2000 ($R_{min}$) | 3386.7 ($L_1'$) |
| 0.40 | 2000 | 3426.7 |
| 0.41 | 2000 | 3466.7 |
| 0.42 | 2000 | 3506.7 |
| 0.43 | 2000 | 3546.7 |
| 0.44 | 2000 | 3586.7 |
| 0.45 | 2000 | 3626.7 |
| 0.50 | 2000 | 3826.7 |

Figure 4:
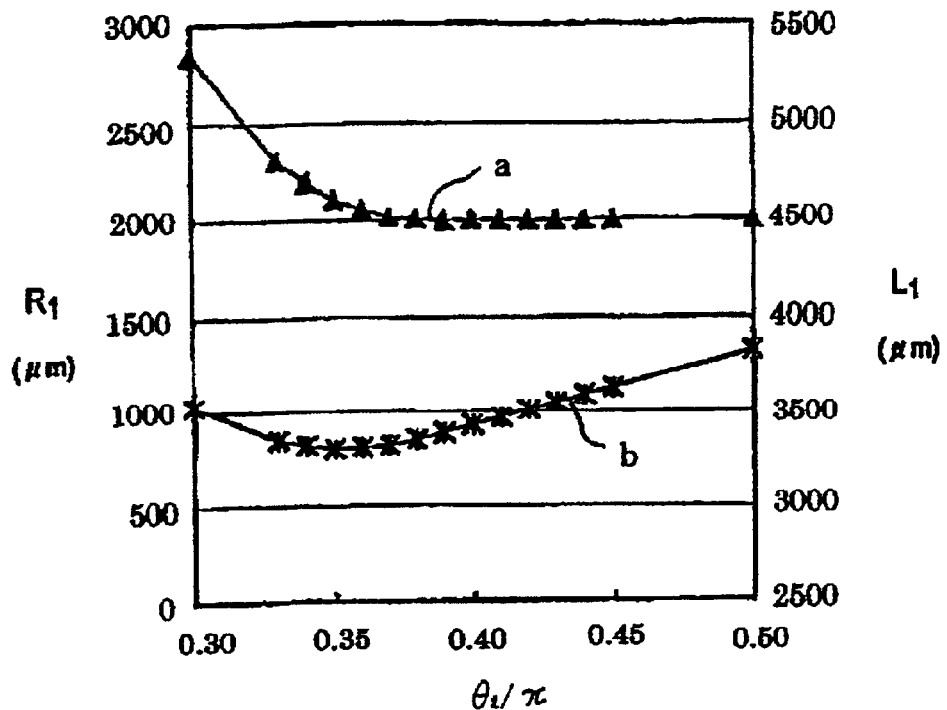
FIG. 4 is a graph showing a relationship between the radius of curvature of the curved portion of the shortest channel waveguide and a half of the central angle, and a relationship between the length of the shortest channel waveguide and the half of the central angle.

As clearly understood from Table 1 and FIG. 4, it is found that the product ($R_1 \times \theta_1$) has the minimum value when the radius ($R_1$) of curvature is 2110 gm and the angle $\theta_1$ is $0.35\pi$ rad. Namely, the optical path length ($L_1$) has the minimum value at this combination of the radius ($R_1$) of curvature and the angle $\theta_1$.

Therefore, in the present embodiment, the shortest channel waveguide ($4a_1$) is formed to have the radius ($R_1$) of curvature of 2110 $\mu$m and the angle $\theta_1$ of $0.35\pi$ rad. Based on the design of the shortest channel waveguide ($4a_1$), the radii of the curvature and the central angles of the channel waveguides (4a) of the second shortest, third shortest and the like are formed.

The present inventors manufactured the arrayed waveguide grating optical multiplexers/demultiplexers which have $\theta_1/\pi$ and $R_1$ as shown in Table 1 and the angle $\theta_1$ within the range from $0.315\pi$ rad to $0.515\pi$ rad. Then, the crosstalks of each arrayed waveguide grating optical multiplexer/demultiplexer were found. For the convenience of the measurement, only adjacent crosstalk was found as the crosstalk of the a arrayed waveguide grating. The result is shown in FIG. 5.

Figure 5:
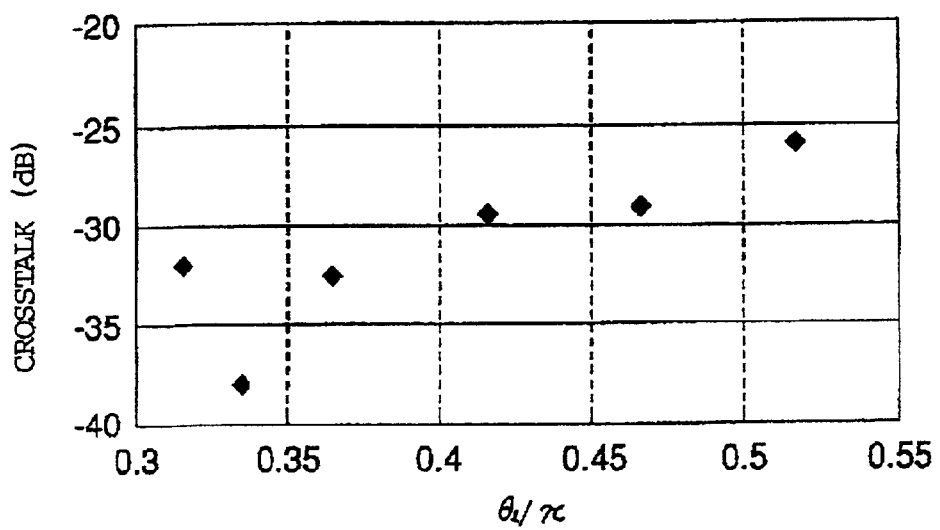
FIG. 5 is a graph showing a loss characteristic when the radius of curvature of the curved portion in the arrayed waveguide grating optical multiplexer/demultiplexer is constant and a value of a half of the central angle is changed.

As clearly understood from the measurement values shown in FIG. 5, when the radius ($R_1$) of curvature is 2250 $\mu$m, which is close in value to 2110 $\mu$m obtained from the simulation results, and the angle $\theta_1$ is $0.335\pi$ rad, which is close in value to $0.35\pi$ rad obtained from the simulation results, the crosstalk can reduce to about −40 dB. Namely, it was confirmed that the crosstalk of the arrayed waveguide grating optical multiplexer/demultiplexer can be minimized by minimizing the product ($R_1 \times \theta_1$). Also, as understood from FIG. 5, when the angle $\theta_1$ is at least about $0.315\pi$ rad and at most about $0.40\pi$ rad, the crosstalk of the arrayed waveguide grating optical multiplexer/demultiplexer can reduce to about −30 dB or less.

According to the present embodiment, the arrayed waveguide grating optical multiplexer/demultiplexer is formed by setting the radius ($R_1$) of curvature of the curved portion of the shortest channel waveguide ($4a_1$) and the angle $\theta_1$ such that the product ($R_1 \times \theta_1$) is the minimum value within the range in which all of the channel waveguides can be drawn. Therefore, the optical path lengths of all of the channel waveguides (4a) can be made minimum.

Accordingly, the phase errors in the arrayed waveguide can be suppressed in the embodiment, to thereby reduce the influence by the manufacturing errors at the time of manufacturing the arrayed waveguide grating optical multiplexer/demultiplexer. As a result, the arrayed waveguide grating optical multiplexer/demultiplexer in which the crosstalk is suppressed may be obtained.

The present invention is not limited to the aforementioned embodiment, and can be applied to various embodiments. For example, although the radius ($R_1$) of curvature is 2250 $\mu$m and the angle $\theta_1$ is $0.335\pi$ rad in the embodiment, the angle $\theta_1$ may be at about $0.315\pi$ rad to $0.40\pi$ rad, and the radius ($R_1$) of curvature may be the values corresponding thereto in Table 1. In this case, the crosstalk can be also made small at about −30 dB or less, to thereby the achieve arrayed waveguide grating optical multiplexer/demultiplexer in which the crosstalk is suppressed.

As described above, in the arrayed waveguide grating optical multiplexer/demultiplexer according to the embodiment of the present invention, it will suffice to set the radius ($R_1$) of curvature and the angle $\theta_1$ such that the product ($R_1 \times \theta_1$) results in a value in the allowable range which includes the minimum value and in which all of the channel waveguides can be drawn.

Further, the parameters in the arrayed waveguide grating optical multiplexer/demultiplexer are not limited to those shown in the aforementioned embodiments, and can be modified freely. In case the parameters different from those in the embodiment are used, the radius ($R_1$) of curvature and the angle $\theta_1$ are different from those in the aforementioned embodiment.

In the embodiment, the first connection portions 7 ($7a_1$, $7a_2$, ...) located in the first slab waveguide 3 side and the second connection portions 9 ($9a_1$, $9a_2$, ...) located in the second slab waveguide 5 have the tapered sections 11 which respectively have the widths increased toward the slab waveguides (3 and 5). Also, constant width sections 12 are formed respectively between the respective tapered sections 11 and the corresponding curved portions 8 ($8a_1$, $8a_2$, ...). However, the constant width sections 12 may be omitted.

In other words, in the arrayed waveguide grating optical multiplexer/demultiplexer, in case that the lights entered from the optical input waveguide 2 side, for example, are entered into the arrayed waveguide 4 through the first slab waveguide 3 to be propagated through the arrayed waveguide 4, the pitch of the outgoing ends of the first connection portions 7 ($7a_1$, $7a_2$, ...) in the adjacent channel waveguides (4a) such that the lights respectively propagated through the adjacent channel waveguides (4a) are not overlapped. Thus, if the arrayed waveguide grating optical multiplexer/demultiplexer is formed such that the pitch of the narrow width ends of the tapered sections 11 in the first slab waveguide 3 side is set at the value satisfying the above condition, the constant width section 12 in the first slab waveguide 3 side can be omitted.

Similarly, in the arrayed waveguide grating optical multiplexer/demultiplexer, in case that the lights entered from the optical output waveguide 6 side, for example, are entered into the arrayed waveguide 4 through the second slab waveguide 5 to be propagated through the arrayed waveguide 4, the pitch of the outgoing ends of the second connection portions 9 (9$a_1$, 9$a_2$, ...) in the adjacent channel waveguides (4$a$) such that the lights respectively propagated through the adjacent channel waveguides (4$a$) are not overlapped. Thus, if the arrayed waveguide grating optical multiplexer/demultiplexer is formed such that the pitch of the narrow width ends of the tapered sections 11 in the second slab waveguide 5 side is set at the value satisfying the above condition, the constant width section 12 in the second slab waveguide 5 side can be omitted.

Also, the tapered section 11 may be formed as the linear waveguide instead of being tapered. However, by forming the tapered sections 11, the first and second slab waveguides 3, 5 and the channel waveguides (4$a$) can be efficiently connected, to thereby provide arrayed waveguide grating optical multiplexer/demultiplexer in which the loss is small.

Further, although each channel waveguide (4$a$) is formed substantially symmetrical with respect to the center position of the length thereof in the aforementioned embodiment, each channel waveguide (4$a$) can be formed laterally asymmetrical with respect to the center position of the length thereof.

Figure 7:
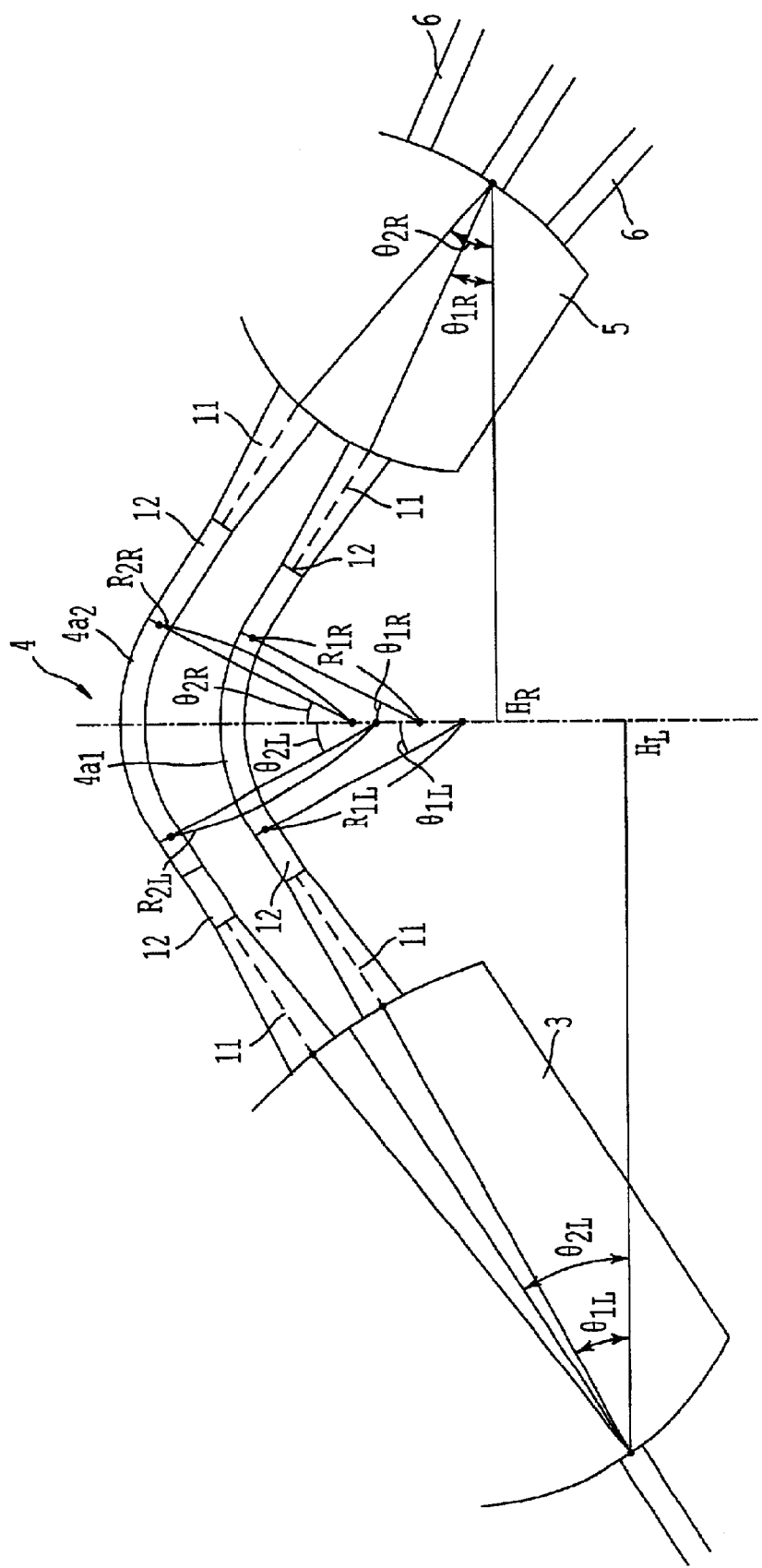
FIG. 7 is an enlarged, schematic diagram showing a part of channel waveguides and peripheries thereof of an arrayed waveguide grating optical multiplexer/demultiplexer according to yet another embodiment of the present invention.

Referring to FIG. 7, a left half of each curved portion constitutes a first curved section, and a right half of each curved portion constitutes a second curved section. Then, in the shortest channel waveguide, the first radius of curvature of the first curved section is ($R_{1L}$), and the second radius of curvature of the second curved section is ($R_{1R}$). Also, in the shortest channel waveguide, the first central angle of the first curved section is $\theta_{1L}$, and the second central angle of the second curved section is $\theta_{1R}$. In this case, the radii ($R_{1L}$, $R_{1R}$) of curvature and the angles ($\theta_{1L}$, $\theta_{1R}$) are set such that the first product expressed by ($R_{1L} \times \theta_{1L}$) and the second product expressed by ($R_{1R} \times \theta_{1R}$) respectively result in the values within the allowable range which includes the minimum value and in which all of the channel waveguides can be drawn.

In case the channel waveguides (4$a$) are laterally asymmetrical as described above, the first length of the connection region of the shortest channel waveguide in the first slab waveguide side is ($L_{const(L)}$), and the second length of the connection region of the shortest channel waveguide in the second slab waveguide side is ($L_{const(R)}$). In this case, the optical path length ($L_1$) of the shortest channel waveguide (4$a_1$) is set at the value within the allowable range including ($L_{const(L)} + L_{const(R)} + R_{1L} \times \theta_{1L} + R_{1R} \times \theta_{1R}$), As described above, by setting the radii ($R_{1L}$, $R_{1R}$) of curvature of the curved portions, the angles ($\theta_{1L}$, $\theta_{1R}$) and the optical path length ($L_1$) of the shortest channel waveguide, even if the channel waveguides (4$a$) are laterally asymmetrical in the arrayed waveguide grating optical multiplexer/demultiplexer, the substantially same effects as in the embodiment described first can be achieved.

Figure 6:
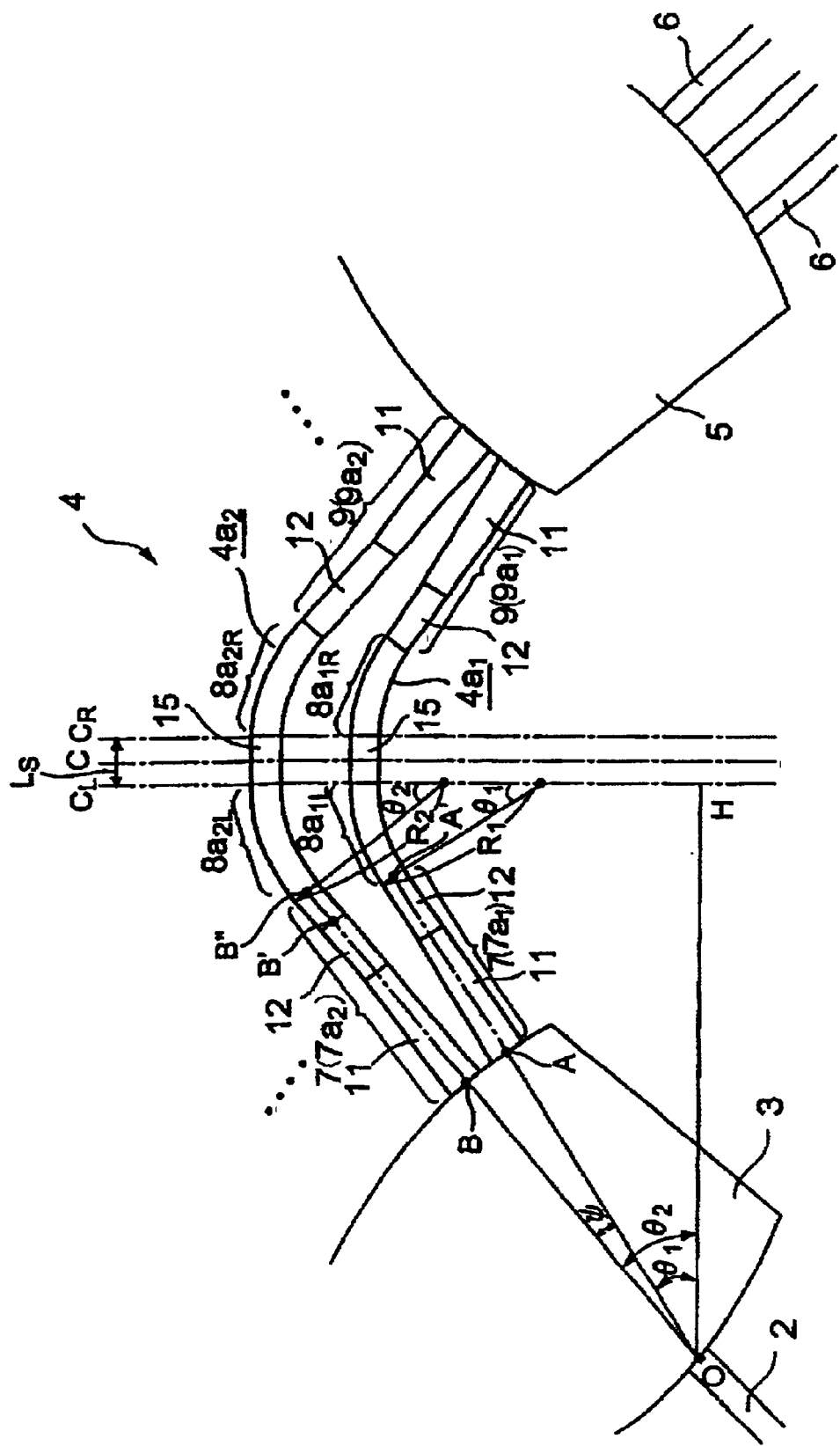
FIG. 6 is an explanatory diagram showing a part of channel waveguides and peripheries thereof in an arrayed waveguide grating optical multiplexer/demultiplexer having straight sections at central portions of the channel guides according to another embodiment of the present invention.

Further, in the arrayed waveguide grating optical multiplexer/demultiplexer, a straight section 15 may be formed at a central portion of each of the curved portions 8 (8$a_1$, 8$a_2$, ...) in the respective channel waveguides (4$a$) as shown in FIG. 6, for example. As shown in FIG. 6, if the straight sections 15 are formed at the central portions of the curved portions 8 (8$a_1$, 8$a_2$, ...), groove(s) for inserting a half-wave plate or a plurality of half-wave plates crossing the central portions of the channel waveguides 4$a$ can be formed substantially perpendicularly to the optical axises of the waveguides.

Incidentally, the size of the straight section 15 is not limited to the specific one. As an example, in case the groove for inserting the half-wave plate is formed, the width of the groove is set at about 20 to 30 $\mu$m, and the length ($L_s$) may be set at about 500 to 1000 $\mu$m. Also, in FIG. 6, the straight sections 15 are formed symmetrical with respect to the center line (C), in other words, the portion in $C_L$–C is the same form as the portion in $C_R$–C.

When the groove(s) for inserting the half-wave plate(s) are formed by providing the straight sections 15 to thereby place the half-wave plate(s) in the groove(s), the half-wave plate(s) can be inserted substantially perpendicularly to the optical axes of the waveguides, so that the rotation of the plane of the polarization as the function of the half-wave plate can be conducted with the excellent control. Accordingly, the arrayed waveguide grating optical multiplexer/demultiplexer can exhibit excellent polarization characteristics.

Also, in the arrayed waveguide grating optical multiplexer/demultiplexer shown in FIG. 6, the straight sections 15 are respectively formed at the center portions of the curved portions 8 (8$a_1$, 8$a_2$, ...) of the channel waveguides (4$a$) substantially symmetrical with respect to the center positions of the lengths thereof. However, even if the channel waveguides (4$a$) are laterally asymmetrical as shown in FIG. 7, the straight sections 15 may be formed at the central portions of the channel waveguides (4$a$). In this case, the substantially same effects can be also achieved. In FIG. 6, the curved portions 8 are indicated as 8$a_{1L}$, 8$a_{2L}$, 8$a_{1R}$ and 8$a_{2R}$.

According to the embodiments of the present invention, by setting the radius of curvature and the central angle of the curved portion of the shortest channel waveguide to be the adequate value within such a range that all of the channel waveguides can be drawn, the optical path lengths of all of the channel waveguides can be made to the minimum value or the value close to the minimum value. Therefore, the phase errors in the arrayed waveguide can be suppressed, and the influence of the manufacturing errors can be reduced, to thereby achieve the arrayed waveguide grating optical multiplexer/demultiplexer in which the crosstalk is suppressed.

Also, according to the structure of the embodiments of the present invention, the arrayed waveguide grating optical multiplexer/demultiplexer can be designed easily, and the arrayed waveguide grating optical multiplexer/demultiplexer exhibiting the aforementioned excellent effects can be achieved.

Further, according to the embodiments of the present invention, in which the straight section is formed at the central portion of the curved portion of each channel waveguide, the groove for inserting the half-wave plate therein can be precisely formed at the central portion of the channel waveguide. Also, the half-wave plate is inserted into the groove, to thereby exhibit the function thereof sufficiently.

According to the structure of the embodiments of the present invention, in which at least one of the connection portion of the channel waveguide in the first slab waveguide side and the connection portion in the second slab waveguide side includes a tapered section having the width increased toward the corresponding slab waveguide, the slab waveguide and the channel waveguide can be connected efficiently, to thereby achieve the arrayed waveguide grating optical multiplexer/demultiplexer with the small loss.

According to the structure of the embodiments of the present invention, in which at least one of the connection portion of the channel waveguide in the first slab waveguide side and the connection portion in the second slab waveguide side includes the constant width section disposed between the tapered section and the curved portion, it can be securely prevented that the lights propagated through the adjacent channel waveguides are overlapped with each other, to thereby achieve the arrayed waveguide grating optical multiplexer/demultiplexer which can be operated well.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An arrayed waveguide grating optical multiplexer/demultiplexer comprising:

at least one first optical waveguide;

a first slab waveguide;

an arrayed waveguide connected to said at least one first optical waveguide via said first slab waveguide, said arrayed waveguide comprising a plurality of channel waveguides each of which has a different length and which include a shortest channel waveguide having a shortest length;

a second slab waveguide;

a plurality of second optical waveguides connected to said arrayed waveguide via said second slab waveguide; and each of the plurality of channel waveguides including first and second connection portions and a curved portion provided between the first and second connection portions, the first connection portion being connected to the first slab waveguide, the second connection portion being connected to the second slab waveguide, the shortest channel waveguide having a radius ($R_1$) of curvature of the curved portion and an angle ($\theta_1$) which is a half of a central angle of the curved portion, the radius ($R_1$) of curvature and the angle ($\theta_1$) being determined such that a product ($R_1 \times \theta_1$) of the radius ($R_1$) of curvature and the angle ($\theta_1$) is a value within a range which includes a minimum value of the product ($R_1 \times \theta_1$) and in which all of the plurality of channel waveguides are drawn.

2. An arrayed waveguide grating optical multiplexer/demultiplexer according to claim 1, wherein each of said channel waveguides is formed substantially symmetrical with respect to a central position along a length of each of said channel waveguides, the first and second connection portions having a length of ($L_{const}$), and the optical path length ($L_1$) of the shortest channel waveguide is a value within a range which includes a value of $\{2 \times (L_{const} + R_1 \times \theta_1)\}$.

3. An arrayed waveguide grating optical multiplexer/demultiplexer according to claim 1, wherein at least one of the first and second connection portions has a tapered section which is connected to the first or second slab waveguide and which has a width increasing toward the first or second slab waveguide.

4. An arrayed waveguide grating optical multiplexer/demultiplexer according to claim 3, wherein at least one of the first and second connection portions has a constant width section which is provided between the curved portion and the tapered section and which has a substantially constant width.

5. An arrayed waveguide grating optical multiplexer/demultiplexer according to claim 1, wherein the radius ($R_1$) of curvature is equal to or larger than a minimum radius ($R_{min}$) of curvature which is a minimum value within a range in which a light signal having wavelength range in use is not substantially attenuated.

6. An arrayed waveguide grating optical multiplexer/demultiplexer according to claim 5, wherein the minimum radius ($R_{min}$) of curvature is determined based on a relative refractive index difference of the arrayed waveguide grating optical multiplexer/demultiplexer, widths of the channel waveguides, and the wavelength range in use.

7. An arrayed waveguide grating optical multiplexer/demultiplexer according to claim 1, wherein the curved portion includes a straight section which is provided around a center along a longitudinal direction of the curved portion.

8. An arrayed waveguide grating optical multiplexer/demultiplexer according to claim 7, further comprising:

a half-wave plate which is provided in a groove formed in the straight section of the curved portion.

9. An arrayed waveguide grating optical multiplexer/demultiplexer comprising:

at least one first optical waveguide;

a first slab waveguide;

an arrayed waveguide connected to said at least one first optical waveguide via said first slab waveguide, said arrayed waveguide comprising a plurality of channel waveguides each of which has a different length and which include a shortest channel waveguide having a shortest length;

a second slab waveguide;

a plurality of second optical waveguides connected to said arrayed waveguide via said second slab waveguide; and each of the plurality of channel waveguides including first and second connection portions and a curved portion provided between the first and second connection portions, the first connection portion being connected to the first slab waveguide, the second connection portion being connected to the second slab waveguide, the curved portion including a first curved section connected to the first connection portion and a second curved section connected to the second connection portion, the shortest channel waveguide having a first radius ($R_{1L}$) of curvature of the first curved section, a second radius ($R_{1R}$) of curvature of the second curved section, a first angle ($\theta_{1L}$) which is a central angle of the first curved section, and a second angle ($\theta_{1R}$) which is a central angle of the second curved section, the first radius ($R_{1L}$) of curvature, the second radius ($R_{1R}$) of curvature, the first angle ($\theta_{1L}$) and the second angle ($\theta_{1R}$) being determined such that a first product ($R_{1L} \times \theta_{1L}$) of the first radius ($R_{1L}$) of curvature and the first angle ($\theta_{1L}$) is a value within a first range which includes a minimum value of the first product ($R_{1L} \times \theta_{1L}$) and in which all of the plurality of channel waveguides are drawn and a second product ($R_{1R} \times \theta_{1R}$) of the second radius ($R_{1R}$) of curvature and the second angle ($\theta_{1R}$) is a value within a second range which includes a minimum value of the second product ($R_{1R} \times \theta_{1R}$) and in which all of the plurality of channel waveguides are drawn.

10. An arrayed waveguide grating optical multiplexer/demultiplexer according to claim 9, wherein the first radius ($R_{1L}$) of curvature is different from the second radius ($R_{1R}$) of curvature, and wherein the first angle ($\theta_{1L}$) is different from the second angle ($\theta_{1R}$).

11. An arrayed waveguide grating optical multiplexer/demultiplexer according to claim 10, wherein the first connection portion has a first length of ($L_{const(L)}$), the second connection portion has a second length of ($L_{const(R)}$), and the optical path length ($L_1$) of the shortest channel waveguide is a value within a range which includes a value of $\{L_{const(L)}+L_{const(R)}+R_{1L}\times\theta_{1L}+R_{1R}\times\theta_{1R}\}$.

12. An arrayed waveguide grating optical multiplexer/demultiplexer according to claim 9, wherein at least one of the first and second connection portions has a tapered section which is connected to the first or second slab waveguide and which has a width increasing toward the first or second slab waveguide.

13. An arrayed waveguide grating optical multiplexer/demultiplexer according to claim 12, wherein at least one of the first and second connection portions has a constant width section which is provided between the curved portion and the tapered section and which has a substantially constant width.

14. An arrayed waveguide grating optical multiplexer/demultiplexer according to claim 9, wherein the first radius ($R_{1L}$) of curvature and the second radius ($R_{1R}$) of curvature are equal to or larger than a minimum radius ($R_{min}$) of curvature which is a minimum value within a range in which a light signal having wavelength range in use is not substantially attenuated.

15. An arrayed waveguide grating optical multiplexer/demultiplexer according to claim 14, wherein the minimum radius ($R_{min}$) of curvature is determined based on a relative refractive index difference of the arrayed waveguide grating optical multiplexer/demultiplexer, widths of the channel waveguides, and the wavelength range in use.

16. An arrayed waveguide grating optical multiplexer/demultiplexer according to claim 9, wherein the curved portion includes a straight section which is provided between the first and second curved sections.

17. An arrayed waveguide grating optical multiplexer/demultiplexer according to claim 16, further comprising:
a half-wave plate which is provided in a groove formed in the straight section of the curved portion.

18. A method for manufacturing an arrayed waveguide grating optical multiplexer/demultiplexer, comprising:
providing an arrayed waveguide including a plurality of channel waveguides each of which has a different length and which include a shortest channel waveguide having a shortest length, each of the plurality of channel waveguides including first and second connection portions and a curved portion provided between the first and second connection portions, the shortest channel waveguide having a radius ($R_1$) of curvature of the curved portion and an angle ($\theta_1$) which is a half of a central angle of the curved portion;
connecting the first connection portion to a first slab waveguide;
connecting the second connection portion to a second slab waveguide; and
determining the radius ($R_1$) of curvature and the angle ($\theta_1$) such that a product ($R_1\times\theta_1$) of the radius ($R_1$) of curvature and the angle ($\theta_1$) is a value within a range which includes a minimum value of the product ($R_1\times\theta_1$) and in which all of the plurality of channel waveguides are drawn.

19. A method according to claim 18, wherein each of said channel waveguides is formed substantially symmetrical with respect to a central position along a length of each of said channel waveguides, the first and second connection portions having a length of ($L_{const}$), and the optical path length ($L_1$) of the shortest channel waveguide is a value within a range which includes a value of $\{2\times(L_{const}+R_1\times\theta_1)\}$.

20. A method according to claim 18, wherein at least one of the first and second connection portions has a tapered section which is connected to the first or second slab waveguide and which has a width increasing toward the first or second slab waveguide.

21. A method according to claim 20, wherein at least one of the first and second connection portions has a constant width section which is provided between the curved portion and the tapered section and which has a substantially constant width.

22. A method according to claim 18, wherein the radius ($R_1$) of curvature is equal to or larger than a minimum radius ($R_{min}$) of curvature which is a minimum value within a range in which a light signal having wavelength range in use is not substantially attenuated.

23. A method according to claim 22, wherein the minimum radius ($R_{min}$) of curvature is determined based on a relative refractive index difference of the arrayed waveguide grating optical multiplexer/demultiplexer, widths of the channel waveguides, and the wavelength range in use.

24. A method according to claim 18, wherein the angle ($\theta_1$) is at least about $0.315\pi$ rad and at most about $0.40\pi$ rad.

25. A method according to claim 18, wherein the curved portion includes a straight section which is provided around a center along a longitudinal direction of the curved portion.

26. A method according to claim 25, further comprising:
providing a half-wave plate in a groove formed in the straight section of the curved portion.

27. A method for manufacturing an arrayed waveguide grating optical multiplexer/demultiplexer, comprising:
providing an arrayed waveguide including a plurality of channel waveguides each of which has a different length and which include a shortest channel waveguide having a shortest length, each of the plurality of channel waveguides including first and second connection portions and a curved portion provided between the first and second connection portions, the curved portion including a first curved section connected to the first connection portion and a second curved section connected to the second connection portion, the shortest channel waveguide having a first radius ($R_{1L}$) of curvature of the first curved section, a second radius ($R_{1R}$) of curvature of the second curved section, a first angle ($\theta_{1L}$) which is a central angle of the first curved section, and a second angle ($\theta_{1R}$) which is a central angle of the second curved section,
connecting the first connection portion to a first slab waveguide;
connecting the second connection portion to a second slab waveguide; and
determining the first radius ($R_{1L}$) of curvature, the second radius ($R_{1R}$) of curvature, the first angle ($\theta_{1L}$) and the second angle ($\theta_{1R}$) such that a first product ($R_{1L}\times\theta_{1L}$) of the first radius ($R_{1L}$) of curvature and the first angle ($\theta_{1L}$) is a value within a first range which includes a minimum value of the first product ($R_{1L}\times\theta_{1L}$) and in which all of the plurality of channel waveguides are drawn and a second product ($R_{1R}\times\theta_{1R}$) of the second radius ($R_{1R}$) of curvature and the second angle ($\theta_{1R}$) is a value within a second range which includes a minimum value of the second product ($R_{1R}\times\theta_{1R}$) and in which all of the plurality of channel waveguides are drawn.

28. A method according to claim 27, wherein the first radius ($R_{1L}$) of curvature is different from the second radius ($R_{1R}$) of curvature, and wherein the first angle ($\theta_{1L}$) is different from the second angle ($\theta_{1R}$).

29. A method according to claim wherein the first connection portion has a first length of ($L_{const(L)}$), the second connection portion has a second length of ($L_{const(R)}$), and the optical path length ($L_1$) of the shortest channel waveguide is a value within a range which includes a value of $\{L_{const(L)} + L_{const(R)} + R_{1R} \times \theta_{1L} + R_{1R} \times \theta_{1R}\}$.

30. A method according to claim 27, wherein at least one of the first and second connection portions has a tapered section which is connected to the first or second slab waveguide and which has a width increasing toward the first or second slab waveguide.

31. A method according to claim 30, wherein at least one of the first and second connection portions has a constant width section which is provided between the curved portion and the tapered section and which has a substantially constant width.

32. A method according to claim 27, wherein the first radius ($R_{1L}$) of curvature and the second radius ($R_{1R}$) of curvature are equal to or larger than a minimum radius ($R_{min}$) of curvature which is a minimum value within a range in which a light signal having wavelength range in use is not substantially attenuated.

33. A method according to claim 32, wherein the minimum radius ($R_{min}$) of curvature is determined based on a relative refractive index difference of the arrayed waveguide grating optical multiplexer/demultiplexer, widths of the channel waveguides, and the wavelength range in use.

34. A method according to claim 27, wherein the curved portion includes a straight section which is provided between the first and second curved sections.

35. A method according to claim further comprising:

providing a half-wave plate in a groove formed in the straight section of the curved portion.

* * * * *